United States Patent Office 3,053,784
Patented Sept. 11, 1962

3,053,784
ADHESIVE COMPOSITION COMPRISING SODIUM SUBSTITUTED BARK DERIVATIVE AND SODIUM SALT OF POLYMETHYLOL PHENOL
Franklin W. Herrick, Shelton, Wash., and Louis H. Bock, Vancouver, British Columbia, Canada, assignors to Rayonier Incorporated, Shelton, Wash., a corporation of Delaware
No Drawing. Filed Mar. 20, 1961, Ser. No. 96,666
7 Claims. (Cl. 260—29.3)

This invention relates to thermosetting resin-forming compositions, and has for its object the provision of improved compositions advantageously suitable as thermosetting resin adhesives, and a process of producing the compositions. The invention provides a thermosetting resin composition comprising a sodium salt of a polymethylol phenol and a sodium substituted bark derivative of certain coniferous trees, which is a water-resistant resin primarily suitable as an adhesive.

In our co-pending application, Serial No. 564,621, filed February 10, 1956, we describe a thermosetting resin adhesive composition comprising a sodium salt of a polymethylol phenol compound and an alkali-bark derivative. As in the resin of said application, we use a similar polymethylol phenol which can be formed by reacting a phenol having the two ortho and the para positions free, namely, phenol and m-cresol, with formaldehyde in aqueous solution with caustic alkali to form a compound in which the mole ratio of formaldehyde to phenol is from 2.0 to 3.0, preferably from 2.25 to 2.6. It is one of the important aspects of this invention that free formaldehyde is neither present in nor added to the composition. The polymethylol phenol compound is a carrier of formaldehyde which becomes reactive by heating and immediately combines with phenolic constituents of the sodium substituted bark derivative to form an insoluble, infusible resin in the curing of the composition. This not only eliminates the step of mixing free formaldehyde with the phenolic materials which is an objectionable and time-consuming operation but it avoids the escape of free formaldehyde fumes in the hot pressing operations in applying and curing the adhesive.

As described more fully in our said application the alkali-bark derivative is formed by digesting certain coniferous barks in an aqueous alkaline solution at elevated temperatures to form, for example, a water soluble sodium derivative which has the capacity of reacting very rapidly with formaldehyde to form an insoluble infusible resin. While our sodium substituted bark derivative is a form of alkali-bark derivative, it is produced in a different manner and has distinctly different properties than said alkali-bark derivatives, and imparts improved properties to the thermosetting resin composition of this invention.

The sodium substituted bark derivative of this invention is a significantly different compound or complex as manifested by the improved properties of the thermosetting resin adhesive composition of this invention. This invention is, in part, based on our discovery that the bark derivatives produced by digesting certain coniferous barks in aqueous solutions of ammonia can be reacted with sodium hydroxide to form sodium salts or sodium substituted bark derivatives, and also that these bark derivatives form with a sodium salt of a polymethylol phenol our improved compositions. For reasons not presently understood, or predictable, the proportion of ammonia to bark in the extraction is less critical than in the case of alkali metal hydroxide. The sodium substituted bark derivatives show less variation, or more uniformity, in the derivative from different species of barks, and the curing time of the resin adhesive of this invention may be much shorter, about one-third less, than the adhesive formed of the alkali-bark derivative and a similar polymethylol phenol. In fact, resin-forming compositions comprising, say, about equal proportions of the polymethylol phenol and sodium substituted bark derivative have curing times falling within the range of commercial phenolic adhesives.

The barks of different species of trees differ very greatly in their content of alkali-reactive material, presumably containing phenolic groups, which are reactive with formaldehyde. The following tests have been devised to measure the formaldehyde reactivity of the bark derivatives of various trees and duplicate tests were run to compare the reactivity of bark extracts obtained by digesting the bark with sodium hydroxide solutions and aqueous ammonia solutions.

In a 500 ml. beaker, an accurately weighed sample (about 20 g.) of the bark derivative and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37% formaldehyde is added. Water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfite solution. This solution is titrated to pH 9.5 with 0.1 N hydrochloric acid. The reaction is as follows:

$$CH_2O + Na_2SO_3 + H_2O \rightarrow CH_2O \cdot NaHSO_3 + NaOH$$

From this titration is calculated the initial formaldehyde concentration.

After four hours a 5 ml. sample of the original solution is withdrawn, diluted with 50 ml. of water and adjusted to pH 7 with 0.1 N hydrochloric acid. To this solution is added 10 ml. of 10% sodium sulfite solution and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash free bark material.

The above method of determining formaldehyde was described by Lemme, Chem. Ztg. 27, 896 (1903).

The ammonia extracts have approximately the same formaldehyde reactivity as the sodium hydroxide extracts. Since $NH_3$ has a formaldehyde reactivity by this test a correction has been made for the free $NH_3$ present in the extract. This correction is as follows:

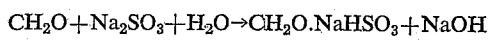

$$\text{Percent } CH_2O = \frac{30 \text{ times } 1.5x}{14} = 3.21x$$

Where $x$=percent non-combined nitrogen. This value is subtracted from the value obtained by the foregoing procedure. The following table lists formaldehyde reactivities of representative bark derivative extracts made with aqueous solutions of sodium hydroxide and ammonia and measured by the foregoing test.

| Species | Formaldehyde Reactivities | |
|---|---|---|
| | NaOH Extract | $NH_3$ Extract |
| Western hemlock | 8.4 | 7.4 |
| Douglas fir | 6.4 | 6.6 |
| Sitka spruce | 6.0 | 7.4 |
| White fir | 6.6 | 5.3 |
| Southern yellow pine | 6.0 | 7.5 |

All of the above species yield ammonia extracts of bark which are useful in forming the adhesive resins of the invention. In general, the bark of any species of tree which will yield an ammonia extract with a formaldehyde reactivity of 5% or more can be used in preparing the thermosetting resin adhesives of this invention.

Species which have been found suitable include, Western hemlock (*Tsuga heterophylla*), Douglas fir (*Pseudotsuga menziesii*), Sitka spruce (*Picea sitchensis*), White fir (*Abies amabilis*) and Southern yellow pine (*Pinus echinata, Pinus palustris, Pinus taeda, Pinus caribaea, Pinus elliotti* and *Pinus rigida* var. *serotina*). In general, coniferous trees are suitable but deciduous trees are not.

In the copending application of John Charles Steinberg and Kenneth Russell Gray, Serial No. 535,300, filed September 19, 1955, now U.S. Patent 2,823,223 a process of digesting a wide variety of tree barks in aqueous solutions of ammonia is described and claimed. We can use any of the bark extracts of said application having a reactivity of at least 5%.

In the said process, the ammonia to bark ratio, the extraction temperature and the extraction time are all interrelated in their effect on the composition of the bark derivative and its ultimate utility. We have discovered that the ammonia to bark ratio should be varied inversely to the extraction temperature and/or extraction time within certain limits. At low temperatures, high ammonia to bark ratios can be used and time is not critical except for yield. As the temperature is raised, and particularly as it reaches 100° C. or more both ammonia to bark ratios and extraction times become somewhat more critical, especially if the derivative is to be used in a fast-curing adhesive.

Table I illustrates the maximum ammonia to bark ratios that will yield satisfactory derivatives for fast-curing adhesives at various extraction temperatures and times. All derivatives were made by the process described in Example I.

TABLE I

| $NH_3$ to Bark Ratio | Extraction Temp., ° C. | Maximum Extraction Time, minutes |
|---|---|---|
| 1.5 | 17 | 240 or more |
| 1.5 | 25 | 240 |
| 0.8 | 75 | 240 |
| 0.8 | 100 | 120 |
| 0.4 | 125 | 90 |
| 0.2 | 150 | 60 |
| 0.1 | 170 | 30 |

The effect of the interrelation of various extraction conditions on net yield is illustrated in Table II.

TABLE II

| Bark Species | $NH_3$ to Bark Ratio | Extraction | | Net Yield, Percent |
|---|---|---|---|---|
| | | Temp., ° C. | Time, min. | |
| Hemlock | 0.02 | 150 | 30 | 20.5 |
| Do | 0.05 | 150 | 30 | 23.5 |
| Do | 0.10 | 150 | 30 | 26.4 |
| Do | 0.10 | 170 | 60 | 27.0 |
| Do | 0.15 | 150 | 30 | 30.2 |
| Do | 0.20 | 150 | 30 | 32.5 |
| Do | 0.40 | 25 | 60 | 12.4 |
| Do[1] | 0.40 | 75 | 30 | 31.3 |
| Do[1] | 0.40 | 100 | 30 | 34.0 |
| Do[1] | 0.40 | 125 | 30 | 39.4 |
| Do[1] | 0.4 | 150 | 30 | 38.6 |
| Do[1] | 0.4 | 170 | 30 | 35.8 |
| Do | 0.8 | 100 | 30 | 37.4 |
| Do | 0.8 | 125 | 30 | 46.2 |
| Do | 1.5 | 17 | 60 | 16.3 |
| So. Pine | 0.1 | 100 | 30 | 16.7 |
| Do | 0.15 | 150 | 30 | 25.7 |
| Amabilis Fir | 0.15 | 150 | 30 | 18.5 |
| Sitka Spruce | 0.15 | 150 | 30 | 34.9 |

[1] Illustrates that a maximum yield is reached as the severity of the extraction is increased after which the yield decreases.

The thermosetting resin adhesive compositions of our invention are prepared by mixing a sodium substituted bark derivative of an ammonia bark extract with a sodium salt of polymethylol phenol, either in dry form or in aqueous solution.

Phenol has three reactive positions and each molecule can react with three molecules of formaldehyde. This was demonstrated by Granger, Ind. Eng. Chem. 29, 860 (1937), and the product trimethylol phenol was recently isolated from this reaction by Freeman, J.A.C.S. 74, 6257 (1952). When a mixture of phenol and excess formaldehyde is heated under alkaline conditions, an insoluble, infusible resin is formed in which the ratio of formaldehyde to phenol is about 1.5 to 1.6. If the condensation went infinitely far the ratio would be 1.5 but actually there are end groups which may contain free methylol groups so the ratio is slightly above 1.5. If trimethylol phenol is heated in the presence of alkali, it will form the same end-product with a formaldehyde-phenol ratio of about 1.5 to 1.6. The excess formaldehyde is split out in the reaction. We have found that a polymethylol compound, such as trimethylol phenol, or a low condensed polymethylol phenol having a formaldehyde-to-phenol ratio of over 2.0, can be mixed with an alkaline solution of the sodium substituted bark derivative to form a stable soution which can be stored for 30 days or more at room temperature. This solution contains all the components required for a thermosetting adhesive and can be cured by heating. The material is an effective plywood adhesive capable of being used in the production of exterior type plywood.

It is important that the polymethylol phenol condensate used in the present invention contain no free formaldehyde. If free formaldehyde is present it will react immediately with the sodium substituted bark derivative causing the solution to gel. We have found that formaldehyde reacts very rapidly with phenol in the presence of a high molar ratio of sodium hydroxide. In the presence of about 0.75 mole of sodium hydroxide per mole of phenol, the reaction with formaldehyde is strongly exothermic and the reaction mixture heats up to refluxing temperature of its own accord. If the reaction mixture is cooled rapidly after the exotherm has subsided the solution is free of formaldehyde, provided the ratio of formaldehyde to phenol is less than 3. The Cannizzario reaction in which formaldehyde is converted to methanol and sodium formate is also favored by high mole ratios of sodium hydroxide and high temperature. However, the reaction rate of the Cannizzaro reaction is slower than the rate of reaction of formaldehyde with phenol under these conditions. If the strongly alkaline solution of polymethylol phenol is heated, another reaction occurs which results in the condensation of the polymethylol phenol to a polymer and the simultaneous liberation of formaldehyde.

The formation of trimethylol phenol, its condensation and the Cannizzaro reaction are illustrated by the following equations:

(a) 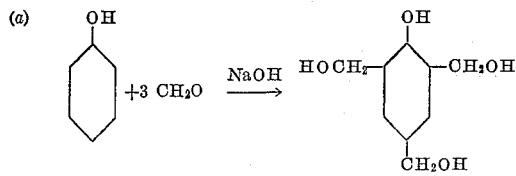

(b) 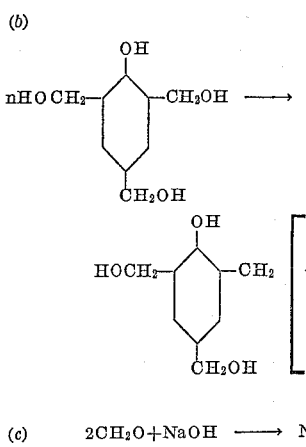

$+(n-1) CH_2O + (n-1) H_2O$ (c)  $2CH_2O + NaOH \longrightarrow NaOOCH + CH_3OH$ In reaction (b) free formaldehyde is liberated and a polymer containing a lower ratio of formaldehyde to phenol is formed. The free formaldehyde is objectionable as indicated above, since it will react immediately when mixed with the sodium substituted bark derivative. The loss of reactive methylol groups in the polymethylol phenol is also a disadvantage since there are then fewer reactive functional groups available to react with the sodium substituted bark derivative. The Cannizzaro reaction (c) should be minimized since it merely results in the loss of valuable formaldehyde.

It has been found in carrying out the reaction of phenol with formaldehyde, as practiced in this invention, that the product contains a mixture of monomeric polymethylol phenols and low condensation products. This is in agreement with the published work of Freeman, Jour. Am. Chem. Soc. 74, 6257 (1952) and Anal. Chem. 24, 955 (1952) who demonstrated the formation of dimers. Kammerer, Makromol. Chem. 8, 85 (1952) also showed that polymethylol phenols split out formaldehyde when heated with alkali, as indicated in Equation b. It would be desirable to limit the reaction of formaldehyde and phenol so as to form only monomeric products, since then full use of the formaldehyde could be made in a later reaction with bark derivative. This is, however, not practical, since the reaction of formaldehyde with phenol is too slow at low temperature and the higher temperature used to promote the reaction also promotes the condensation to polymeric products. Furthermore, the sodium salts of trimethylol phenol and tetramethylol dihydroxy diphenol methane ($n=2$) have limited solubility in water and tend to crystallize from solution. Therefore, a compromise must be reached by maintaining the reaction mixture at elevated temperature only long enough to effect complete reaction of the formaldehyde. The condensation to polymers is held to a minimum by cooling to stop the reaction as soon as the formaldehyde has all reacted.

Assuming that all available positions ortho and para to the hydroxyl are reacted with formaldehyde at the end of the heating period, the degree of condensation can be estimated as follows:

Referring to Equation c, it is evident that the only reaction resulting in the disappearance of sodium hydroxide is the Cannizzaro reaction and that each mole of sodium hydroxide consumed in this reaction corresponds to the disappearance of two moles of formaldehyde. In order then to determine the number of moles of formaldehyde involved in the Cannizzaro reaction, it is only necessary to determine by titration the number of moles of sodium hydroxide consumed and to multiply by 2. The number of moles of formaldehyde combined with phenol is obtained by subtracting the number of moles involved in the Cannizzaro reaction from the total added at the start of the reaction. Dividing by the number of moles of phenol used in the reaction gives the ratio of combined formaldehyde to phenol.

If $x$ is the molar ratio of combined formaldehyde to phenol and $n$ is the average number of phenol units in a molecule of product, the degree of polymerization is obtained by the equation:

$$n = \frac{1}{x-2}$$

Actually, it is difficult to obtain a combined ratio of formaldehyde to phenol above 2.5, and examples given in this specification range in value from 2.35 to 2.45 combined when a ratio of 2.6 is used in the preparation. The corresponding $n$ values, therefore, range from 2.85 to 2.0. In other words, the predominating chain length is two to three phenol units.

When a polymethylol phenol solution is mixed with a solution of the sodium substituted bark derivative there is substantially no reaction at room temperature. Such a solution can be stored for weeks with only a slight increase in viscosity. When the solution is evaporated and heated reaction (b) can occur. The liberated formaldehyde can then react with the sodium substituted bark derivative forming an insoluble infusible resin. A more likely reaction is that the polymethylol phenol may condense directly with the bark derivative without splitting out free formaldehyde as illustrated below,

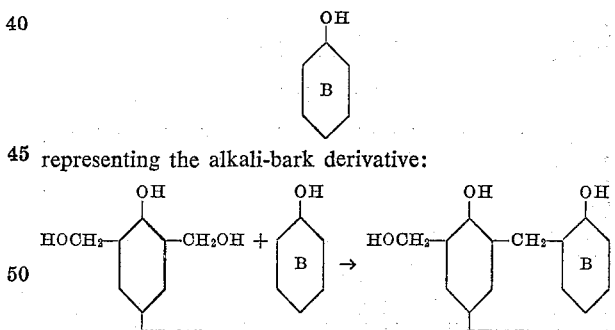

representing the alkali-bark derivative:

It is to be understood therefore that in discussing the excess or released free formaldehyde which reacts with the sodium substituted bark derivatives its existence may not be of finite duration. It may be of such an evanescent nature that it serves as a coupling radical and we accordingly are concerned with its capacity to effect polymerization and not with its status as a possible free material.

This last reaction could continue until a three dimensional solid polymer were formed. We do not know which mechanism is followed in the curing of the resin formed from polymethylol phenol and the bark derivative. The important part is that this combination is reasonably stable to storage and can be cured to an insoluble, infusible resin which is effective as an adhesive, and particularly as an adhesive for bonding wood particle boards, plywood, paper and like materials.

In forming the sodium polymethylol phenol compound, we may use phenol, the 85% commercial phenol, m-cresol or mixtures thereof, which have three hydrogen positions free, and combine therewith in sodium hydroxide aqueous solution enough formaldehyde so that the mole ratio of formaldehyde to phenol is from 2.0 to 3.0, and advantageously in which the ratio is nearer 3.0. If the formaldehyde be present in excess of 3.0, free formaldehyde would be present. We prefer to leave the polymethylol phenol compound in the aqueous solution in which it is formed and to add it directly to the aqueous solution of bark derivative, thereby providing a desirable amount of alkali in the composition. However, as indicated above, the solution may be spray dried to form a free-flowing powder which is stable to storage, and can be readily dissolved in water.

The invention will be described more in detail with reference to the examples which set forth specific illustrative embodiments of the sodium substituted bark derivative, the polymethylol phenol compounds and the thermosetting resin adhesive composition, and the use of the composition in the adhesive bonding of plywood.

The following example illustrates the preparation of a sodium substituted bark derivative for use in our invention:

*Example I*

Western hemlock bark was hogged to sizes not larger than that which will pass a screen of about 2 meshes to the inch. An autoclave equipped with mechanical agitator was charged with a quantity of the hogged bark corresponding to 100 parts of dry bark, aqueous ammonia corresponding to 10 parts of anhydrous ammonia and water to make a total charge of 670 parts. The autoclave was heated rapidly to 150° C. and held at that temperature with agitation for 30 minutes. The reaction mixture was then discharged and pressed through a 200 mesh screen to remove solid particles. The extract was analyzed and found to contain 26.4 parts of dissolved solids. 5.28 parts in solution of sodium hydroxide was then added (corresponding to 20% the weight of dry solids) and the solution was vacuum concentrated to 25% solids. The solution was then spray dried to form a fine, dark colored, free-flowing powder. The gross yield was 31.7 parts.

The following example illustrates a process for the preparation of polymethylol phenol for use in thermosetting resin compositions of our invention:

*Example II*

A reaction vessel equipped with mechanical agitator, reflux condenser and cooling jacket was charged with 25.4 parts of 94.5% phenol and 54 parts of 37% formaldehyde. The solution was cooled to 20–25° C. and 20.6 parts of 36% sodium hydroxide solution was added. The agitator was started and the temperature rose from the heat of reaction to 65° C. in 13 minutes. Cooling water was then turned into the jacket and the temperature rose more gradually to 85° C. in 8 minutes. Hot water was then turned into the jacket to bring the reaction temperature to 92° C. where the mixture refluxed. The hot water was then turned off and the mixture continued to reflux for 30 minutes at which time cold water was turned into the jacket to cool the mixture and stop the reaction. The resulting solution had a specific gravity of 1.195, a cured resin solids of 47.2% and a viscosity at 25° C. of 41 centopoises.

If desired the solution can be spray dried or it can be mixed with the bark derivative and the combination can then be spray dried.

The following is an example of the preparation of a thermosetting resin adhesive composition of our invention and its use in forming plywood.

*Example III*

To 120 parts of the spray dried ammonia extract of Example I containing 20 parts of sodium hydroxide was added 193 parts of water and 195 parts of the solution of polymethylol phenol described in Example II. The mixture was agitated with efficient mixing paddles until a homogeneous solution was obtained. The solution contained 40% solids and had a viscosity of 4.5 poises. To 100 parts of the solution was added 8 parts of Furafil (ground corn cob residue) and the mixture was applied to one-tenth inch Douglas fir veneer at a spread of 55 lbs. per thousand square feet of double glue line. The veneer was assembled into 3-ply panels and after an assembly time of 10 minutes pressed two panels to an opening between platens at 140° C. and a pressure of 175 p.s.i. for 6 minutes. The resulting plywood was subjected to the standard boil test for exterior type plywood as described in Commercial Standards CS–45–55. The average wet shear was 173 p.s.i. and the wood failure was 86%. This meets the requirements for exterior type Douglas fir plywood.

Alternately the adhesive solution can be prepared by using the corresponding amount of spray dried sodium polymethylol phenol. In this case 120 parts of spray dried sodium substituted bark derivative extract as above, 92 parts of spray dried sodium salt of polymethylol phenol and 338 parts of water were mixed until homogeneous and to 100 parts of this solution 8 parts of Furafil was added.

The ratio of polymethylol phenol to sodium substituted bark derivative may be varied over wide limits. The minimum ratio is about 47 parts of sodium polymethylol phenol in the form of its sodium salt corresponding to 25 parts of phenol per 100 parts of the sodium salt of the ammonia bark extract. Higher ratios of polymethylol phenol can be used but lower ratios result in poorer adhesives. Because of economic considerations it is advantageous to use as little polymethylol phenol as is required to give the necessary curing properties to the resin. The ratio of formaldehyde to phenol in the polymethylol phenol is also important. In Example II the molar ratio of formaldehyde to phenol used is 2.6. If this ratio is less than 2.5, a higher proportion of polymethylol phenol must be used in the adhesive composition. The preferred ratio of formaldehyde to phenol used in the preparation is 2.5 to 2.6. However, a ratio as low as 2.25 can be used if a suitably higher proportion of polymethylol phenol to extract is used.

*Example IV*

An ammonia extract of Western hemlock bark prepared as in Example I, except that the ratio of anhydrous ammonia to dry bark was 0.4, was concentrated and spray dried and was obtained in a yield of 38.6% based on the weight of the original dry bark. An adhesive solution containing 83.4 parts of this extract, 16.6 parts of NaOH, 157 parts of water and 162.5 parts of the polymethylol phenol solution of Example II, contained 41.4% total solids and had a viscosity of 7.7 poises at 25° C. A sample of this solution that was stored at room temperature for three weeks had a viscosity of 22 poises. A glue mix containing 8 parts of Furafil per 100 parts of the above adhesive solution was used to prepare Douglas fir plywood as illustrated in Example III. A pressing time of 4 minutes at 140° C. and 175 p.s.i. for single ¼ inch 3-ply panels gave 85% wood failure in plywood after the exterior plywood boiling water test. In the above adhesive formulation the weight ratio of NaOH to bark extract was 0.2 and the ratio of phenol to extract plus NaOH was 0.39.

This example demonstrates that sodium substituted ammonia extracts of bark have utility in moderate-curing adhesives when extracted under more severe conditions than those usable in the case of fast-curing adhesives (see Table I, infra). The extract in this example gave an adhesive which had a wood failure of only 50% after the boil test when tested on a fast-curing adhesive test basis. (A wood failure of 85% has been set up as a minimum for exterior-type plywood adhesives.) When tested on the basis of a moderate-curing adhesive (longer curing time), however, the wood failure result rose to 85% and the adhesive was quite satisfactory.

Example V

An ammonia extract of hemlock bark prepared as in Example I, except that the ratio of $NH_3$ to bark was 0.15 was treated with 20 parts of NaOH per 100 parts of extract solids and spray dried. A solution containing 120 parts of this product, 174 parts of water and 121 parts of the polymethylol phenol solution of Example II had a viscosity of 19.5 poises at 25° C. and contained 42.4% total solids. This adhesive formulation contained a ratio of 0.25 of phenol to sodium salt derivative of the bark extract. Plywood prepared as in Example III showed 85% wood failure after the boil test when a pressing schedule of 10 min. at 140° C. for two ¼ inch panels was used.

This example shows that a ratio of 4 parts of a sodium substituted bark extract to one part phenol (as polymethylol phenol) will yield an entirely satisfactory adhesive under the proper conditions.

The rapid press time of Example IV of 4 minutes was due to the fact that only single panels were pressed. In Example V a faster curing adhesive was used but the 10 minute curing time was due to the pressing of double panels. Had single panels been pressed the time would have been less than 4 minutes.

Example VI

A yield of 25.7% of dry extract was obtained from mixed Southern pine bark using a ratio of 0.15 of ammonia to dry bark and other conditions as in Example I. A solution of 100 parts of this extract, 20 parts of NaOH, 187 parts of water and 195 parts of the polymethylol phenol solution of Example II, contained 39.5% total solids and had a viscosity of 4.8 poises at 25° C. Plywood prepared as in Example III showed 89% wood failure after the boil test for a pressing schedule of 6 minutes at 140° C. for two ¼ inch panels per press opening.

Example VII

Barks of various coniferous trees were extracted under the conditions described in Example I. The sodium substituted derivatives thus obtained were mixed with the polymethylol phenol solution of Example II and Furafil in the proportions set out in Example III. These adhesive mixtures were then applied to Douglas fir veneer and pressed into plywood, as described in Example III. Gross yields of extract and cure times of adhesive containing the same are shown in the following table:

| Species of Bark Used | Gross Yield of Extract, Percent | Cure Time Required to Meet Specifications for Exterior Grade Plywood, in minutes |
|---|---|---|
| Amabilis fir | 18.5 | 6.0 |
| Douglas fir | 33.0 | 6.5 |
| Sitka spruce | 37.3 | 6.0 |
| Redwood | 32.0 | 5.5 |

The thermosetting resin adhesive composition of our invention has various uses as in the preparation of plywood, wood particle board, in the bonding of veneer, paper or plastic sheets to board, and for other purposes where a water-resistant fast-curing or a moderately slow-curing resin adhesive is desired. In the bonding of wood ply panels or boards the resin adhesive is especially advantageous because it can be cured in about the same time as the more expensive commercial phenolic resin adhesives.

This application is a continuation-in-part of our co-pending application Serial No. 539,011 filed October 6, 1955, now abandoned, and application Serial No. 605,725, filed August 23, 1956, now U.S. Patent 3,025,250.

We claim:

1. A thermosetting resin adhesive composition comprising a sodium substituted bark derivative obtained by extracting the bark of a coniferous tree with from 0.02 to 1.5 part by weight of ammonia per part of bone dry bark in aqueous solution for at least 15 minutes at a temperature of from 17° to 170° C., forming a product having a formaldehyde reactivity of at least 5% and reacting the ammonia extract with sodium hydroxide to form a sodium substituted bark derivative, and a sodium salt of polymethylol phenol in which the molar ratio of combined formaldehyde to phenol is 2.25 to 2.6.

2. A thermosetting resin adhesive composition according to claim 1 which comprises at least 47 parts of the polymethylol phenol per 100 parts of sodium substituted bark derivative.

3. The process of forming a thermosetting resin adhesive which comprises reacting an aqueous ammonia extract of coniferous bark formed by digesting the bark in an aqueous solution containing from 0.02 to 1.5 parts ammonia by weight per part of bone dry bark for from 15 to 240 minutes at a temperature of from 17° to 170° C. forming a product having a formaldehyde reactivity of at least 5%, reacting said product with sodium hydroxide to form a sodium substituted bark derivative, and mixing the sodium substituted bark derivative with a polymethylol phenol in the form of its sodium salt in which the molar ratio of combined formaldehyde to phenol is from 2.25 to 2.6 in an amount corresponding to at least 47 parts of polymethylol phenol per part of sodium substituted bark derivative.

4. In the process of claim 3 mixing together aqueous suspensions of said sodium substituted bark derivative and said polymethylol phenol.

5. In the process of claim 4 drying the mixed aqueous suspension to form a dry powder.

6. In the process of claim 3 mixing together said sodium substituted bark derivative and said polymethylol phenol when in a dry state.

7. In the process of claim 3 reacting the coniferous bark with aqueous ammonia in which the ammonia to bark ratio is varied substantially inversely to the extraction time or temperature.

References Cited in the file of this patent

UNITED STATES PATENTS

| 2,574,784 | Heritage | Nov. 13, 1951 |
| 2,574,785 | Heritage | Nov. 13, 1951 |
| 2,773,847 | Pauley | Dec. 11, 1956 |

UNITED STATES PATENT OFFICE
CERTIFICATE OF CORRECTION

Patent No, 3,053,784                                   September 11, 1962

Franklin W. Herrick et al.

It is hereby certified that error appears in the above numbered patent requiring correction and that the said Letters Patent should read as corrected below.

Column 7, line 60, for "centopoises" read -- centipoises --; column 8, line 24, for "sodium" read -- solid --.

Signed and sealed this 15th day of January 1963.

(SEAL)
Attest:

ERNEST W. SWIDER
Attesting Officer

DAVID L. LADD
Commissioner of Patents